United States Patent [19]

Dohogne

[11] Patent Number: 4,910,861
[45] Date of Patent: Mar. 27, 1990

[54] METHOD OF MANUFACTURING RETENTION STRUCTURE FOR ELECTRIC MOTOR ROTOR MAGNETS

[75] Inventor: L. Ranney Dohogne, St. Louis County, Mo.

[73] Assignee: Emerson Electric Co., St. Louis, Mo.

[21] Appl. No.: 255,713

[22] Filed: Oct. 7, 1988

[51] Int. Cl.[4] ............................................ H07K 15/02
[52] U.S. Cl. .................................. 29/598; 264/272.2; 310/43; 310/156
[58] Field of Search .................. 29/598, 596; 310/43, 310/156; 264/272.2, 272.19

[56] References Cited

U.S. PATENT DOCUMENTS

| | | | |
|---|---|---|---|
| 2,488,729 | 11/1949 | Kooyman | 310/43 X |
| 2,749,456 | 6/1956 | Luenberger | 310/43 X |
| 4,173,822 | 11/1979 | Futterer et al. | 29/596 |
| 4,633,113 | 12/1986 | Patel | 310/156 |
| 4,792,712 | 12/1988 | Stokes | 310/156 |

Primary Examiner—Carl E. Hall
Attorney, Agent, or Firm—Polster, Polster and Lucchesi

[57] ABSTRACT

An improved shaft mounted rotor assembly for an electric motor and method of manufacturing the same wherein a plurality of arcuate permanent magnets are positioned in angularly related adjacent positions to surround the outer periphery of a shaft mountable rotor core and a plastic molded sleeve encapsulates the exposed outer peripheral surfaces of the magnets to secure them in fast position on the core.

20 Claims, 5 Drawing Sheets

METHOD OF MANUFACTURING RETENTION STRUCTURE FOR ELECTRIC MOTOR ROTOR MAGNETS

BACKGROUND OF THE INVENTION

The present invention relates to electric motors and more particularly to an improved shaft mounted rotor core including permanent magnet segments mounted thereon and a method of manufacturing the same.

The rotors of speed control motors and of brushless DC electric motors include permanently magnetized bar segments which are held in firm relation to a rotor core by a suitable securing device. A number of past securing devices have included adhesives, clamps and wedges and, more recently, outer metallic sleeves, it being important that such devices be capable of withstanding the centrifugal forces created by the high speed of rotor rotation, as well as being capable of withstanding the axial and angular forces which can arise during manufacture, assembly and operation. Examples of rotor assemblies of the prior art include the circumferentially mounted laminated keeper, support ring and end plate arrangement of U.S. Pat. No. 3,221,194, issued to A. B. Blackburn on Nov. 30, 1965; the more recent wound, high modulus, composite fiber sleeve which is interference fit with a rotor hub assembly, as disclosed in U.S. Pat. No. 4,729,160, issued to G. W. Brown on Mar. 8, 1988; and the even more recent thin tubular metallic sleeve having residual tension to press the permanent magnets against the rotor core, as is disclosed in U.S. Pat. No. 4,742,259, issued to E. J. Schaefer et al. on May 3, 1988.

The present invention, recognizing that these past arrangements have been comparatively costly and difficult in both manufacture and assembly, as well as sometimes presenting problems of magnet chipping, of high electrical conductivity and of concomitant residual eddy currents, provides an improved, economical method of manufacturing and constructing a rotor assembly for an electric motor that minimizes and restrains stray magnetic chips which might occur during manufacture, assembly and operation, that closely controls the outer diameter of the rotor core/magnets assembly, that securely and compressively holds such rotor core/magnets assembly in fast relation, that is readily adaptable to various environmental conditions and configurations and that minimizes undesirable rotor eddy currents which might otherwise arise during rotor operations.

It is to be understood that various other features of the present invention will become obvious to one skilled in the art upon reading the disclosure set forth herein.

SUMMARY OF THE INVENTION

More particularly the present invention provides an improved shaft mounted rotor assembly for an electric motor comprising: a cylindrical rotor core adapted to be mounted on a motor shaft; a plurality of arcuate shaped permanent magnets positioned in angularly related adjacent positions to substantially surround the outer periphery of the rotor core; and a plastic molded cylindrical sleeve of low electrical conductivity encapsulating the exposed outer peripheral surfaces of the permanent magnets to secure the magnets in fast position on the rotor core. In addition, the present invention provides a unique and novel method for manufacturing a shaft mounted rotor assembly for an electric motor comprising: mounting a plurality of permanent magnets in angularly related adjacent positions on a cylindrical bored rotor core having inner and outer peripheral surfaces to substantially surround the outer peripheral surface of the core; supporting the cylindrical rotor core in a preselected position by support means inserted in the core to extend along the inner peripheral surface of the core; encasing the core/magnets assembly in an opposed pair of cooperating mold members contoured to matingly surround the outer peripheral surface of the permanent magnets in preselected spaced relationship therewith providing a space therebetween; and injecting a plastic molding material into the preselected space between the molds and the outer peripheral surfaces of the magnets to encapsulate the magnets in a unified integral plastic molded sleeve. In addition, the present invention provides novel mold and support arrangements, a further novel core/magnets assembly and specific plastic materials particularly suited for the core/magnets assembly, in accordance with the environmental conditions to be confronted by the electric motor.

It is to be understood that various changes can be made by one skilled in the art in one or more of the several parts of the novel structures described herein and in one or more of the several steps of the novel method described herein without departing from the scope or spirit of the invention.

BRIEF DESCRIPTION OF THE DRAWINGS

Referring to the drawings which disclose an advantageous embodiment of the inventive rotor assembly, a method of forming the same and further modified embodiments thereof.

DETAILED DESCRIPTION OF THE INVENTION

Figures 1, 2:
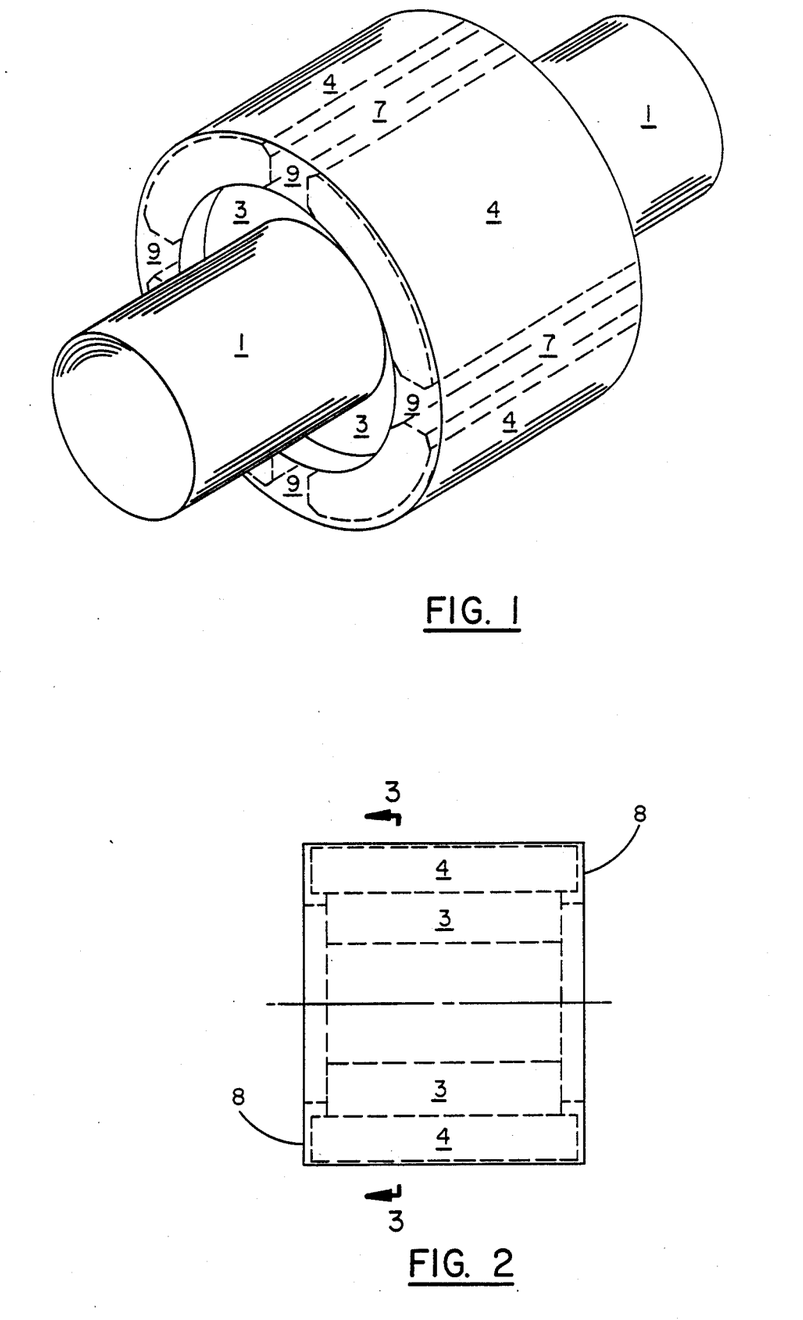
FIG. 1 is an isometric view of one advantageous embodiment of the rotor core assembly of the present invention mounted on a shaft.
FIG. 2 is a side view of the rotor assembly of FIG. 1.

Referring to FIGS. 1-4, the inventive rotor assembly 2 is disclosed in FIG. 1 as mounted on a rotor shaft 1 normally made from a suitable metallic material shaped to be rotatably supported by bearings (not shown) within a conventional motor stator (also not shown).

The rotor assembly includes a bored core 3 and a plurality (four being disclosed) of arcuate permanent magnets 4 mounted in spaced adjacent position on the outer periphery of core 3 to surround the core 3 in a core/magnets assembly. Rotor core 3 can be formed from a stack of disk-shaped laminations made from a suitably selected magnetic material such as steel sheet. Alternatively, the rotor core 3 can be formed from a suitably bored, solid cylinder of steel or of compressed powdered metal or can even be part of the shaft as an enlarged cylindrical portion in the shape of the core, all as is known in the art. In accordance with the present invention, the rotor core can be provided with a plurality of spaced peripheral slots 6 extending in longitudinal fashion parallel to the rotational axis of core 3. As can particularly be seen in FIG. 3 of the drawings, slots 6 have a smaller cross-sectional breadth at the peripheral surface of the core than internally of the core. It is to be understood that when the core 3 is formed from stacked laminations, the slots can be stamped or otherwise formed in each lamination and when the core is of solid magnetic material or compressed powdered magnetic material, such slots can be formed in a suitable method compatible with the formation of the core material. As will be understood hereinafter, the number, spacing and dimensioning of the slots in core 3 is in accordance with the number, resulting spaces and positioning of the permanent magnets.

Figure 3:
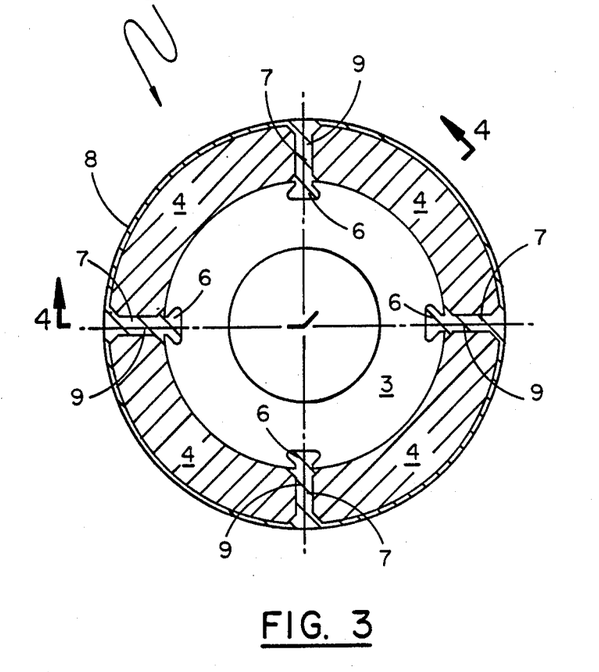
FIG. 3 is a cross-sectional view of the rotor assembly of FIGS. 1 and 2 taken in a plane through line 3—3 of FIG. 2.
Figure 4:
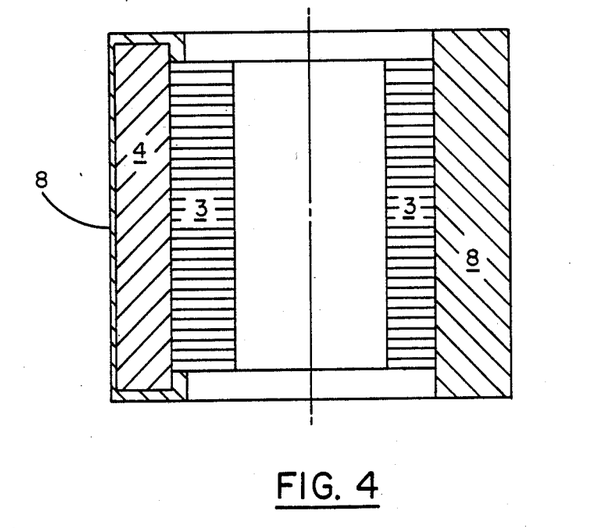
FIG. 4 is a cross-sectional view of the rotor assembly of FIGS. 1-3 taken in a plane through line 4—4 of FIG. 3.

Referring to FIGS. 1-4 of the drawings, four similar arcuately shaped magnets are disclosed, the magnets being adhesively fastened in angularly spaced relation to surround the outer periphery of rotor core 3 with their longitudinal axis parallel the axis of core rotation. The magnets 4 are so sized in width and length that the spaces 7 formed between adjacent longitudinal sides thereof are aligned with the aforedescribed longitudinally extending peripheral slots 6 of core 3, and the opposed ends of the magnets extend a preselected distance beyond the opposed ends of rotor core 3 (FIGS. 2 and 4). It is to be noted in FIG. 3 that the opposed longitudinal edges of each longitudinal side of each magnet are chamfered at a preselected angle so that the aligned slots 6 in core 3 and spaces 7 between the longitudinal sides of adjacent magnets are of barbed, dog-bone cross-section (FIG. 3). In this regard, it has been found advantageous that the combined angle formed by intersecting planes passing through opposed chamfered longitudinal edges should be in excess of ninety (90°) degrees and preferably be approximately one hundred and thirty-four (134°) degrees when the core 3 is formed by four magnets to insure an interlock gripping of the magnet centroid during rotor operations. For a six magnet core, the combined angle would have to be greater than sixty (60°) degrees, and for an eight magnet core, the combined angle would have to be greater than forty-five (45°) degrees. In other words, the multiple of the combined angle times the number of magnets should exceed three hundred and sixty (360°) degrees to avoid slippage and insure an interlock gripping of the magnets in fast relation to the core during rotor operation.

The magnets 4 advantageously can be formed from a suitable ceramic magnetic ferrite material or some other suitable magnetic material. Advantageously, the adhesive used to fasten the inner peripheral face of the arcuate magnets to the outer peripheral face of the rotor core should be capable of both firmly holding the magnets to the core and of absorbing any thermal expansion of core 3. In this regard, an adhesive formed from a suitable fast setting acrylic material can be utilized when the core/magnet assembly is destined for use generally in an open motor environment and an adhesive formed from a suitable slower setting, chemically resistant epoxy material of higher bond strength can be utilized when the core/magnet assembly is destined for use in a hermetically sealed motor environment or a high-speed open motor environment.

To further ensure that the permanent magnets are firmly held in place and from being thrown off of rotor core 3 into the stator (not shown) due to the centrifugal forces on the magnets caused by rotor core rotation, a plastic molded cylindrical sleeve 8 encapsulates the exposed peripheral surface of permanent magnets 4 to compressively hold the magnets 4 in fast position on rotor core 3. Sleeve 8 includes integral protrusions 9 extending from the inner surface thereof to fill the aligned slots 6 of rotor core 3 and spaces of barbed, dog-bone cross-section between the sides of the chamfered edge magnets 4 (FIG. 3). Further, as can be seen in FIGS. 2 and 4, the outer ends of plastic sleeve 8 turn radially inward against the outer opposite protruding ends of the magnets 4 and along the inner periphery of magnets 4 to the opposed ends of rotor core 3 to thus encapsulate the magnets, restraining any possible magnetic chips as well as each magnet itself from being thrown off the rotor core due to the centrifugal forces which are created when the core/magnets assembly of the motor is rotated on shaft 1 within its stator. It is to be understood that in accordance with a further embodiment of the present invention, the rotor core 3 can also be provided with spaced peripheral slots similar to slots 6 extending longitudinally along the inner periphery thereof which inner periphery can be preselectively spaced from shaft 1. Further, the outer periphery of the shaft 1 can include longitudinally extending splines or even slots similar to slots 6 with the outer ends of sleeve 8 turning radially inward to not only encapsulate the ends of magnets 4 but to extend along the ends of rotor core 3 and to fill the spaces between the longitudinally slotted inner periphery of rotor core 3 and the splined or slotted shaft 1.

Figure 5:
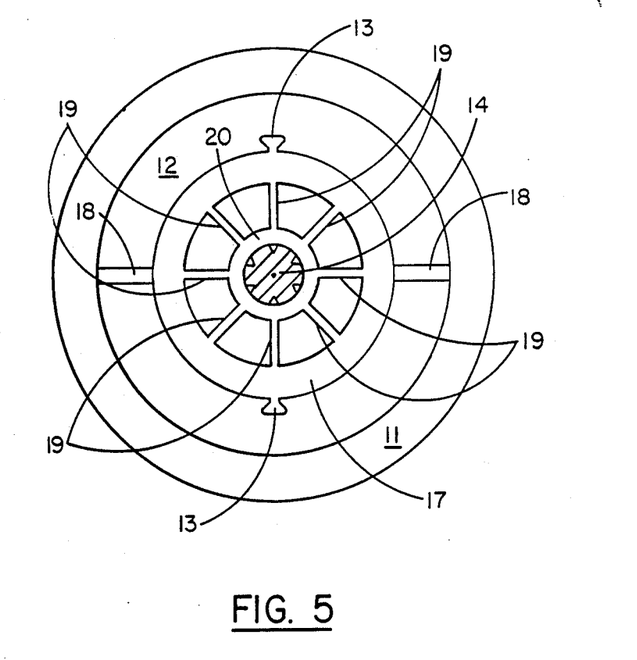
FIG. 5 is a schematic cross-sectional view of a further modified embodiment of the inventive rotor assembly.

Referring to FIG. 5 of the drawings, a schematic crosssection of an embodiment of the invention such as that immediately above described can be seen to include outer molded plastic cylindrical sleeve 11 which encapsulates a set of permanent magnets (not shown) mounted on cylindrical rotor core 12, the inner peripheral surface of which includes longitudinally extending slots 13. It is to be noted that, in this embodiment of the invention, the inner peripheral surface of rotor core 12 is spaced from shaft 14, and in turn is provided with a number of longitudinally extending slots 13. As above described, the outer ends of molded plastic sleeve 11, which sleeve encapsulates the peripheral surfaces of the magnets, are turned radially inward to encapsulate the ends of the magnets and extend along the ends of the rotor core further forming an inner molded plastic sleeve 17 which is connected to the outer sleeve 11 by means of molded plastic end runners 18 formed in suitable end channels in rotor core 12. The inner molded plastic sleeve 17 surrounding the inner peripheral slotted surface of core 12 has radially spaced molded plastic spokes 19 extending inwardly therefrom to connect with a further molded plastic sleeve 20 which surrounds the outer periphery of splined shaft 14. It is to be understood that the entirety of the molded plastic parts including plastic sleeves 11, 17 and 21, spaced radial spokes 19 and the molded plastic covering the ends of the magnets and forming runners 18 advantageously can be integrally formed. Further, it is to be understood that molded plastic radial spokes 19 can be so designed as to have sufficient radial strength to withstand the high motor torques to which the spokes would be subjected during motor operation but which, at the same time, can flex sufficiently to absorb motor torque pulsations.

Figure 6:
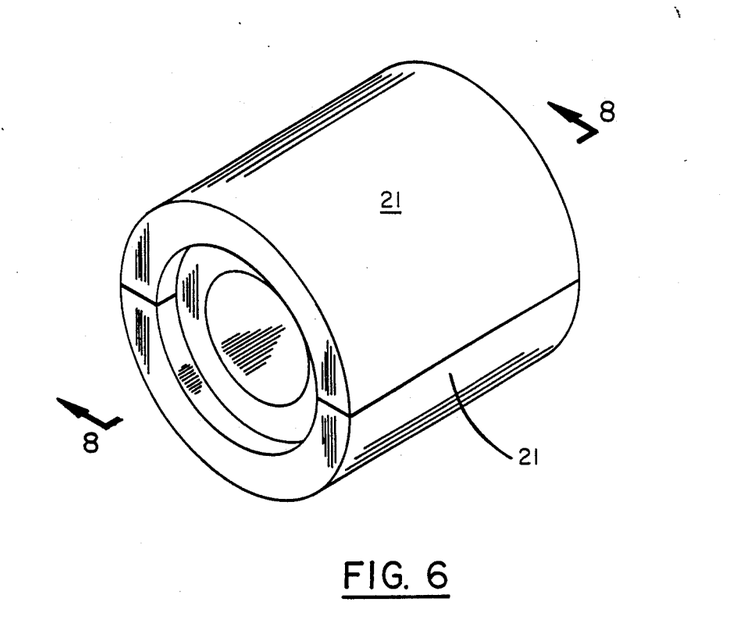
FIG. 6 is an isometric view of an opposed cooperative pair of molds which can be used in carrying out the novel method of the present invention, the molds meeting in an encapsulating position in a plane extending through or parallel to the longitudinal axis of rotation of the core/magnet assembly to be supported therein.
Figure 7:
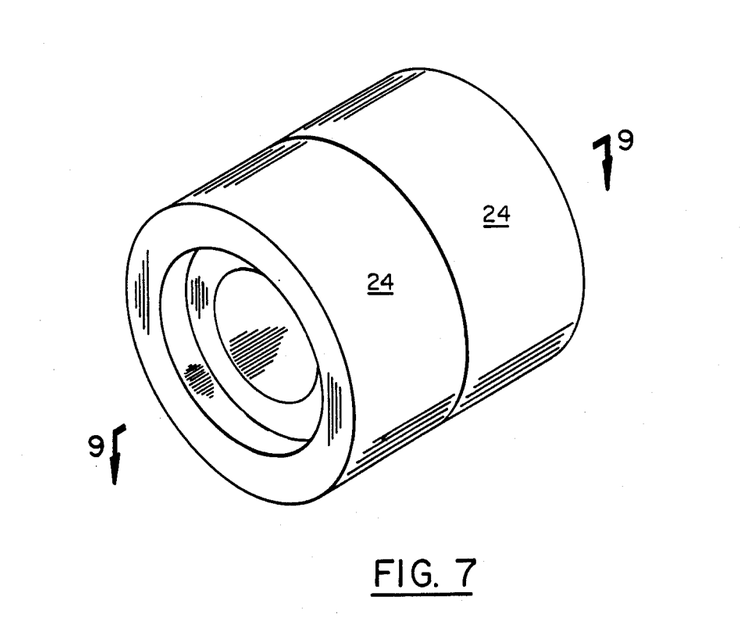
FIG. 7 is an isometric view of another arrangement of an opposed cooperative pair of molds which can be used in carrying out the novel method of the present invention, the molds meeting in an encapsulating position in a plane extending normal to the longitudinal axis of rotation of the core/magnets assembly to be supported therein.

In carrying out the inventive method of the present invention, two basic types of mold pairs can be utilized, as disclosed in FIGS. 6 and 7 of the drawings. These mold pairs, which are utilized to matingly surround the outer peripheral surfaces of a core/magnets assembly in preselected spaced relation therewith and through which can be injected a plastic molding material into the preselected space between the molds and the core/magnets to encapsulate the core/magnets in a plastic molded sleeve, can matingly engage with each other basically either in a plane extending parallel the rotational axis of the rotor core (FIGS. 6 and 8) or in a plane extending normally or radially to the rotational axis of the rotor core (FIGS. 7 and 9).

Figure 8:
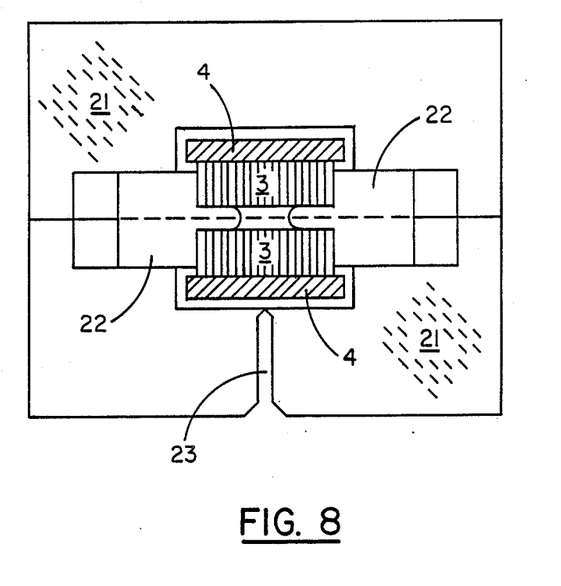
FIG. 8 is a cross-sectional view taken in a plane through line 8—8 of FIG. 6.
Figure 9:
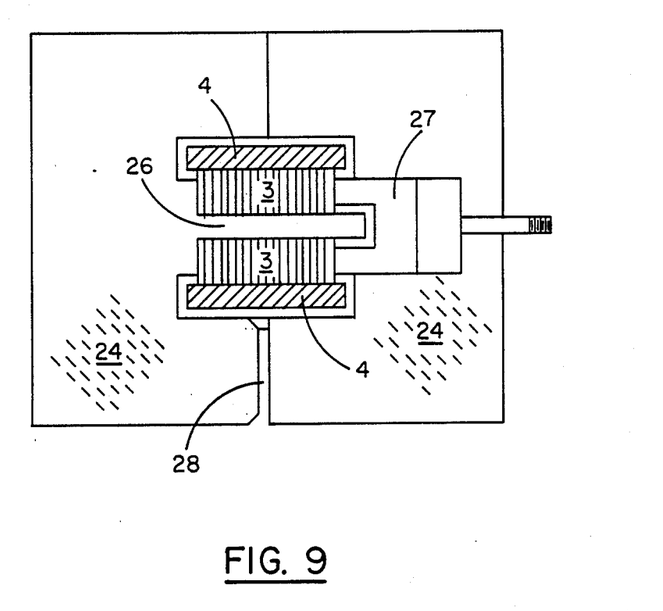
FIG. 9 is a cross-sectional view taken in a plane through line 9—9 of FIG. 7.

Referring to FIGS. 6 and 8, which assembly has been found to be the most advantageous method to use in forming the novel rotor core/permanent magnets assembly, the core/magnets assembly is disclosed in a pair of opposed molds 21—21 which matingly engage or abut in a plane extending parallel the rotational axis of rotor core 3. Prior to insertion within and closing of the molds, a plurality of arcuate permanent magnets 4 which can be formed from a suitable ceramic magnetic ferrite material are adhesively mounted to the outer peripheral face of core 3 by fastening the inner arcuate faces of the magnets 4 to the outer face of the core 3 with either an adhesive formed from a suitable slow setting, chemically resistant material such as an epoxy material when the core/magnets assembly is destined for use in a hermetically sealed environment or a less expensive, fast setting material, such as an acrylic material, when the core/magnets assembly is destined for use in an open motor environment. As above discussed, the rotor core 3 is provided with a plurality of longitudinally extending peripheral slots 6 and the magnets 4 are adhesively fastened to rotor core 3 with their longitudinal sides in spaced relation so that the rotor core slots 6 are aligned with the spaces 7 between the several arcuate magnets 4 which are so sized relative the rotor core 3 in breadth and width to allow such longitudinal spacing 7 between the longitudinal sides of the arcuate magnets 4 with the ends of the magnets extending in overlapping fashion beyond the opposed ends of rotor core 3.

Once the core/magnets assembly has been so adhesively fastened together, the molds 21—21 are positioned to surroundingly encase the core/magnets assembly in spaced relation therewith, the molds engaging in a plane common to or parallel the axis of rotation of the core/magnets assembly. It is to be noted that molds 21—21 and the core/magnets assembly can be heated to a preselected temperature advantageously between approximately 200° F. to 250° F.. The particular temperature of preheating depends upon the chemical nature of the plastic material to be injected into molds 21—21 and the preheating level thereof, which generally is in the approximate range of 500° F. to 525° F. and advantageously 510° F.. The core/magnets assembly can be supported in the molds 21—21 by a pair of opposed mandrels 22 which are shown in the form of slidable pistons disposed in cylinders within the mold pair with the heads thereof shaped to engage opposite ends of the bore of cylindrical rotor core 3. These mandrels can be actuated toward and away from each other by any one of a number of suitable mechanical or fluid means, such as by a camming linkage or by hydraulic pressure (not shown).

With the molds 21—21 in encasing engagement and the core/magnets assembly properly supported by opposed mandrels 22—22, it then only is necessary to inject a suitable plastic material into the molds through channel 23, which communicates with the preselected space between the molds and the mandrel supported core/magnets assembly spacedly surrounded thereby. In this regard, it has been found advantageous to inject a suitable PBT polyester plastic material which has been preheated to a temperature of approximately 510° F. to further enhance flow of the mold material. In accordance with still another feature of the present invention, the plastic material is injected into the mold at sufficiently low pressure to prevent damage to the core/magnets assembly and at the same time promptly fill the preselected space between the peripheral surface and ends of the magnets to encapsulate the magnets and the ends thereof in a plastic molded sleeve. The plastic molded sleeve is allowed to set a preselected time in accordance with the chemical nature of the plastic material used in the injection step. The mandrels 22—22 are then actuated to a disengaging position and the mold pair 21—21 is separated to release the plastic surrounded core/magnets assembly.

In selecting a suitable plastic material to be injected into the mold in accordance with the present invention, a number of criteria were considered besides manufacturing costs, including use of a plastic material with a high flex modulus and tensile strength at the expense of elongation, a high mold flow rate to fill out narrow sections and a high chemical resistance capability for hermetic compressor environments. Among the several possible plastic materials found to be desirable for injection into the molds, besides the above-discussed PBT polyester material, sold commercially by the Celanese Corporation as Celenex 3200, is a polyphenylene sulfide, also sold commercially by the Celanese Corporation as Celanese Fortron 1140. This latter product has been found to have better mold flow properties but is more costly —as is even another higher cost Celanese Corporation plastic material in the form of a liquid crystal polymer polyester which has been found to have premium properties. This liquid crystal polymer polyester is sold by Celanese under the trade name Vectra. Among the lower cost plastic materials suitable for open motors, nylon and other fiberglass filled plastics have been found satisfactory. It, of course, is to be understood that the present invention is not limited to any of the aforementioned plastic materials but that other plastic materials can be utilized, depending upon such parameters as mold contour, motor speed and environmental surroundings.

Referring to FIGS. 7 and 9 of the drawings, still another form of a mold pair 24—24 is disclosed for use in carrying out the several steps of the present inventive method. In this embodiment, the mold pair 24—24 engages in encasing relation in a radial plane which is substantially normal to the axis of rotation of the core/magnets assembly. Further, as can be seen in FIG. 9 of the drawings, one of the molds of pair 24—24 is provided with a suitable cantilevering support mandrel 26 which can be sized and arranged to conformingly extend through the bore of rotor core 3 to support the core in preselected spaced relation within encasing molds 24—24. A suitable hydraulically operated piston 27 slidably mounted in the other mold of mold pair 24—24 serves to hold the rotor core 3 in releasably fast mounted position against the opposite mold. A channel 28 which communicates with the preselected space between the molds and the mandrel supported core/magnets assembly serves, like channel 23, for passage of the injected plastic material.

It is to be understood that the steps of the method employed with the pair of molds 24—24 is substantially like those employed with the pair of molds 21—21 and, accordingly, details of each step are not set forth herein. Further, the steps employed in the method of forming the novel structural arrangement of FIG. 5, would be similar to the above-described method except that it would be necessary to further provide channels at the opposite ends of the rotor core to provide the runners 18 and to provide a mold with a larger preselected space between the inner periphery of the rotor core and the outer peripheral surface of splined shaft 14 which shaft is to be inserted to extend through the mold during molding operations. In this preselected space between molds and core/magnets assembly it also would be necessary to include an additional properly supported sectional, annular mold surrounding the periphery of the splined shaft in spaced relation therewith and with the inner periphery of the rotor core. This inner, annular sectional mold could be provided with suitably sized radial channels connecting the spaces on either face of the mold, which channels would be filled with injected plastic materials to form the radial spokes 19. The inner annular mold necessarily would be appropriately constructed to allow mold release after the plastic material has set and the outer encasing mold pair has been removed.

The invention claimed is:

1. A method for manufacturing a shaft mounted rotor assembly for an electric motor comprising:
   mounting a plurality of permanent magnets in angularly related adjacent positions on a cylindrical bored rotor core having inner and outer peripheral surfaces to substantially surround said outer peripheral surface of said core in a core/magnets assembly;
   supporting said cylindrical core/magnets assembly in a preselected position by support means inserted in said core to extended along said inner peripheral surface of said core;
   encasing said core/magnets assembly in an opposed pair of cooperative mold members contoured to matingly surround the outer peripheral surfaces of said permanent magnets in preselected spaced relation therewith providing a space therebetween; and
   injecting a plastic molding material into said space between said molds and the outer peripheral surfaces of said magnets to encapsulate said magnets in a unified, integral plastic molded sleeve.

2. The method of manufacturing the shaft mounted rotor assembly of claim 1, said opposed pair of cooperating mold members matingly engaging in opposed core encasing relation in a plane extending substantially parallel to the rotational axis of said rotor core.

3. The method of manufacturing the shaft mounted rotor assembly of claim 1, said opposed pair of cooperating mold members matingly engaging in opposed core encasing relation in a plane extending substantially normal to the rotational axis of said rotor core.

4. The method of manufacturing the shaft mounted rotor core assembly of claim 1, said permanent magnets being mounted in angularly spaced relation whereby said injected plastic molding material forms protrusions extending from the inner surface of said plastic molded sleeve into the spaces between said magnets.

5. The method of manufacturing the shaft mounted rotor core assembly of claim 1, including forming a plurality of peripheral slots in the outer peripheral surface of said rotor core, said permanent magnets being mounted in angularly spaced relation with the spaces therebetween in alignment with said peripheral slots whereby said injected plastic molding forms protrusions extending from the inner surface of said plastic molded sleeve into the spaces between said magnets and the aligned peripheral slots.

6. The method of manufacturing the shaft mounted rotor core assembly of claim 1 wherein said mold members are matingly contoured to surround in preselected spaced relation therewith the outer ends of said permanent magnets sized to extend beyond said rotor core ends so that injected plastic molding materials encapsulate the projecting ends of said permanent magnets.

7. The method of manufacturing the shaft mounted rotor core assembly of claim 1 wherein said mold members are matingly contoured to surround in preselected spaced relation therewith the rotor core end, the inner peripheral surface of the rotor core and the outer peripheral surface of a splined shaft extending through said rotor core with radial runner channels extending along the ends of said core between the outer peripheral surface of said permanent magnets and the inner peripheral surface of said rotor core and between the inner peripheral surface of said rotor and outer peripheral surface of said splined shaft so that the injected plastic material flows along said ends and inner peripheral surfaces of said core, all of said runners and the outer peripheral surface of said shaft.

8. The method of manufacturing the shaft mounted rotor core assembly of claim 1, including applying a suitable adhesive to extend between said rotor core and permanent magnets mounted thereon.

9. The method of manufacturing the shaft mounted rotor core assembly of claim 1, including preheating the rotor core and permanent magnets mounted thereon to a preselected temperature to enhance plastic flow.

10. The method of manufacturing the shaft mounted rotor core assembly of claim 1, including preheating the opposed pair of cooperating mold members to a preselected temperature to enhance plastic flow.

11. The method of manufacturing the shaft mounted rotor core assembly of claim 1, including preheating the injected plastic material to enhance plastic flow.

12. The method of manufacturing the shaft mounted rotor assembly of claim 1, including preheating the rotor core/ permanent magnet assembly, the mold members and the injected plastic material to preselected temperatures to enhance plastic flow.

13. The method of manufacturing the shaft mounted rotor assembly of claim 1, including injecting the plastic material at a preselected low pressure to prevent damage to the rotor core/permanent magnet assembly.

14. The method of manufacturing the shaft mounted rotor core assembly of claim 1, including supporting said cylindrical rotor core by a cantilevering mandrel extending from one of said opposed pair of cooperating mold members through one end of said rotor core along the inner peripheral surface of said core; and applying a preselected pressure to the opposite end of said core through the other of said opposed pair of cooperating mold members.

15. The method of manufacturing the shaft mounted rotor core assembly of claim 1, including supporting said cylindrical rotor core by a pair of opposed mandrels extending from said opposed pair of cooperating mold members through opposite ends of said core along the inner peripheral surface of said core.

16. The method of manufacturing the shaft mounted rotor core assembly of claim 1, including injecting a plastic molded material comprising a PBT polyester.

17. The method of manufacturing the shaft mounted rotor core assembly of claim 1, including injecting a plastic molded material comprising a polyphenylene sulfide.

18. The method of manufacturing the shaft mounted rotor core assembly of claim 1, including injecting a plastic molded material comprising a liquid crystal polymer polyester.

19. The method of manufacturing the shaft mounted rotor core assembly of claim 1, including injecting a plastic molded material comprising nylon.

20. A method for manufacturing a shaft mounted rotor assembly for an electric motor comprising:
    adhesively mounting a plurality of permanent magnets in angularly related spaced positions on a rotor core having a plurality of longitudinally extending peripheral slots so that said rotor core slots are aligned with the spaces between said angularly mounted permanent magnets and the outer ends of said magnets extend the ends of said rotor core;
    encasing said rotor core/permanent magnet assembly in an opposed pair of cooperative mold members engaging in a plane extending substantially parallel the rotational axis of said rotor core and contoured to surround the outer peripheral wall and the outer ends of said permanent magnets in preselected spaced relation therewith, said rotor core/magnets assembly being encasingly supported by a pair of opposed reciprocally urged mandrels extending from said opposed pair of cooperating mold members through opposed ends of said core along the inner peripheral wall of said rotor core;
    preheating the opposed pair of cooperating mold members and rotor core/magnets assembly to temperatures within the range of approximately 200° F. to 250° F.;
    injecting a PBT polyester plastic material preheated to a temperature of approximately 510° F. at a sufficiently low pressure to prevent damage to said rotor core/permanent magnets assembly and promptly fill the space between said molds and the outer peripheral surface and ends of said magnets to encapsulate said magnets in a plastic molded sleeve;
    allowing said plastic molded sleeve to set;
    withdrawing said support mandrels; and
    separating said engaging molds to remove said plastic encapsulated rotor core/permanent magnets assembly.

* * * * *